(12) United States Patent
Brauer

(10) Patent No.: US 11,961,219 B2
(45) Date of Patent: Apr. 16, 2024

(54) GENERATIVE ADVERSARIAL NETWORKS (GANs) FOR SIMULATING SPECIMEN IMAGES

(71) Applicant: KLA Corporation, Milpitas, CA (US)

(72) Inventor: Bjorn Brauer, Beaverton, OR (US)

(73) Assignee: KLA Corp., Milpitas, CA (US)

( * ) Notice: Subject to any disclaimer, the term of this patent is extended or adjusted under 35 U.S.C. 154(b) by 555 days.

(21) Appl. No.: 17/170,688

(22) Filed: Feb. 8, 2021

(65) Prior Publication Data

US 2021/0272273 A1  Sep. 2, 2021

Related U.S. Application Data

(60) Provisional application No. 62/982,068, filed on Feb. 27, 2020.

(51) Int. Cl.
| | |
|---|---|
| *G06T 7/00* | (2017.01) |
| *G06N 3/045* | (2023.01) |
| *G06N 3/088* | (2023.01) |
| *G06N 20/00* | (2019.01) |

(52) U.S. Cl.
CPC ............ *G06T 7/0006* (2013.01); *G06N 3/045* (2023.01); *G06N 3/088* (2013.01); *G06N 20/00* (2019.01); *G06T 2207/10061* (2013.01); *G06T 2207/10152* (2013.01); *G06T 2207/20081* (2013.01); *G06T 2207/30148* (2013.01)

(58) Field of Classification Search
CPC ......... G06T 7/0006; G06T 2207/10061; G06T 2207/10152; G06T 2207/20081; G06T 2207/30148; G06N 3/045; G06N 3/088; G06N 20/00; G06N 3/047; G06N 3/08
See application file for complete search history.

(56) References Cited

U.S. PATENT DOCUMENTS

| | | | |
|---|---|---|---|
| 7,570,796 | B2 | 8/2009 | Zafar et al. |
| 7,676,077 | B2 | 3/2010 | Kulkarni et al. |
| 8,126,255 | B2 | 2/2012 | Bhaskar et al. |
| 8,664,594 | B1 | 4/2014 | Jiang et al. |
| 8,692,204 | B2 | 4/2014 | Kojima et al. |
| 8,698,093 | B1 | 4/2014 | Gubbens et al. |
| 8,716,662 | B1 | 5/2014 | MacDonald et al. |
| 9,222,895 | B2 | 12/2015 | Duffy et al. |

(Continued)

OTHER PUBLICATIONS

International Search Report and Written Opinion for PCT/US2021/018643 dated Jun. 15, 2021.

(Continued)

*Primary Examiner* — Lewis G West
(74) *Attorney, Agent, or Firm* — Ann Marie Mewherter

(57) ABSTRACT

Methods and systems for generating a simulated image for a specimen are provided. One system includes one or more computer subsystems and one or more components executed by the one or more computer subsystems. The one or more components include a generative adversarial network (GAN), e.g., a conditional GAN (cGAN), trained with a training set that includes portions of design data for one or more specimens designated as training inputs and corresponding images of the one or more specimens designated as training outputs. The one or more computer subsystems are configured for generating a simulated image for a specimen by inputting a portion of design data for the specimen into the GAN.

18 Claims, 6 Drawing Sheets

(56) References Cited

U.S. PATENT DOCUMENTS

| | | | |
|---|---|---|---|
| 10,115,040 B2 | 10/2018 | Brauer | |
| 10,360,477 B2 | 7/2019 | Bhaskar et al. | |
| 10,402,688 B2 | 9/2019 | Brauer et al. | |
| 11,328,410 B2* | 5/2022 | Brauer | G06F 30/20 |
| 2017/0140524 A1* | 5/2017 | Karsenti | G06T 7/0004 |
| 2017/0148226 A1* | 5/2017 | Zhang | G06T 9/00 |
| 2017/0200265 A1* | 7/2017 | Bhaskar | G06T 7/0004 |
| 2017/0345140 A1* | 11/2017 | Zhang | G06V 10/82 |
| 2019/0096056 A1* | 3/2019 | Giering | G06V 10/764 |
| 2019/0147320 A1* | 5/2019 | Mattyus | G06V 20/182 |
| | | | 382/155 |
| 2019/0257767 A1 | 8/2019 | Shaubi et al. | |
| 2019/0303717 A1 | 10/2019 | Bhaskar et al. | |
| 2021/0026338 A1* | 1/2021 | Yati | G06T 7/0006 |
| 2022/0036539 A1* | 2/2022 | Brauer | G06F 30/20 |

OTHER PUBLICATIONS

Goodfellow et al., "Generative Adversarial Nets," arXiv:1406.2661v1, Jun. 10, 2014, pp. 1-9.

Isola et al., "Image-to-Image Translation with Conditional Adversarial Networks," arXiv:1611.07004v2, Nov. 22, 2017, 17 pages.

Mirza et al., "Conditional Generative Adversarial Nets," arXiv:1411.1784, Nov. 6, 2014, 7 pages.

Szegedy et al., "Going Deeper with Convolutions," 2015 IEEE Conference on Computer Vision and Pattern Recognition (CVPR), Jun. 2015, 9 pages.

\* cited by examiner

GENERATIVE ADVERSARIAL NETWORKS (GANs) FOR SIMULATING SPECIMEN IMAGES

BACKGROUND OF THE INVENTION

1. Field of the Invention

The present invention generally relates to methods and systems for generating a simulated image of a specimen using a generative adversarial network (GAN).

2. Description of the Related Art

The following description and examples are not admitted to be prior art by virtue of their inclusion in this section.

Fabricating semiconductor devices such as logic and memory devices typically includes processing a substrate such as a semiconductor wafer using a large number of semiconductor fabrication processes to form various features and multiple levels of the semiconductor devices. For example, lithography is a semiconductor fabrication process that involves transferring a pattern from a reticle to a resist arranged on a semiconductor wafer. Additional examples of semiconductor fabrication processes include, but are not limited to, chemical-mechanical polishing (CMP), etch, deposition, and ion implantation. Multiple semiconductor devices may be fabricated in an arrangement on a single semiconductor wafer and then separated into individual semiconductor devices.

Inspection processes are used at various steps during a semiconductor manufacturing process to detect defects on wafers to drive higher yield in the manufacturing process and thus higher profits. Inspection has always been an important part of fabricating semiconductor devices. However, as the dimensions of semiconductor devices decrease, inspection becomes even more important to the successful manufacture of acceptable semiconductor devices because smaller defects can cause the devices to fail.

One significant hurdle in setting up most inspection processes is identifying a sufficient number of defects of interest (DOIs) that can then be used to set various parameters of the inspection processes. Such DOIs are typically required for setting both hardware parameters such as optical or other imaging parameters and software type parameters such as defect classification settings, nuisance filter parameters, and the like. If not enough DOI examples can be found on the setup specimen or specimens, the resulting inspection recipe may be sub-optimal for detecting and identifying those DOIs on other specimens.

While nuisance examples may also be required for setting up such hardware and software parameters, nuisance examples tend to be readily and overwhelmingly available. For example, when setting up a new inspection process, a hot scan may be performed on a setup specimen in which the threshold for defect detection is set at, near, or even in the noise floor of the inspection system output. Therefore, such a scan may produce many more nuisance examples than needed, and those nuisances can make identifying DOI examples particularly difficult because they need to be separated from all of the detected events, most of which are nuisances.

Another difficulty in setting up inspection processes is that the setup specimen(s) may not contain any examples of one or more DOI types, which can result in an inspection process that is unable to detect such DOI type(s). Such a difficulty can also arise in maintaining performance of an already setup inspection process. For example, if the DOI types on the inspected specimens change for some reason, the already setup inspection process may not be able to detect the new DOI types. Such an inspection process may even become unusable, requiring an entirely new inspection process setup with a new setup specimen.

The lack of DOI examples can be particularly problematic for using sophisticated techniques such as deep learning (DL) to perform nuisance reduction on an optical or other tool. As a result, inspection recipes may be limited to manual tuning or random forest-based decision trees. However, even for random forest-type decision trees, a certain number of DOI examples are required for training which are sometimes not available. Therefore, one current disadvantage to setting up inspection and other recipes is that sophisticated techniques cannot be used for nuisance reduction in other inspection or quality control type processes when not enough example DOIs are available.

Accordingly, it would be advantageous to develop systems and methods for generating a simulated image of a specimen that do not have one or more of the disadvantages described above.

SUMMARY OF THE INVENTION

The following description of various embodiments is not to be construed in any way as limiting the subject matter of the appended claims.

One embodiment relates to a system configured to generate a simulated image of a specimen. The system includes one or more computer subsystems and one or more components executed by the one or more computer subsystems. The one or more components include a generative adversarial network (GAN) trained with a training set that includes portions of design data for one or more specimens designated as training inputs and corresponding images of the one or more specimens designated as training outputs. The one or more computer subsystems are configured for generating a simulated image for a specimen by inputting a portion of design data for the specimen into the GAN. The system may be further configured as described herein.

Another embodiment relates to a computer-implemented method for generating a simulated image of a specimen. The method includes generating a simulated image for a specimen by inputting a portion of design data for the specimen into a GAN. The inputting is performed by one or more computer subsystems. One or more components are executed by the one or more computer subsystems. The one or more components include the GAN. The GAN is trained with a training set that includes portions of design data for one or more specimens designated as training inputs and corresponding images of the one or more specimens designated as training outputs.

Each of the steps of the method may be further performed as described further herein. The method may include any other step(s) of any other method(s) described herein. The method may be performed by any of the systems described herein.

Another embodiment relates to a non-transitory computer-readable medium storing program instructions executable on one or more computer systems for performing a computer-implemented method for generating a simulated image for a specimen. The computer-implemented method includes the steps of the method described above. The computer-readable medium may be further configured as described herein. The steps of the computer-implemented method may be performed as described further herein. In addition, the computer-implemented method for which the program instructions are executable may include any other step(s) of any other method(s) described herein.

BRIEF DESCRIPTION OF THE DRAWINGS

Further advantages of the present invention will become apparent to those skilled in the art with the benefit of the following detailed description of the preferred embodiments and upon reference to the accompanying drawings in which.

Figure 1:
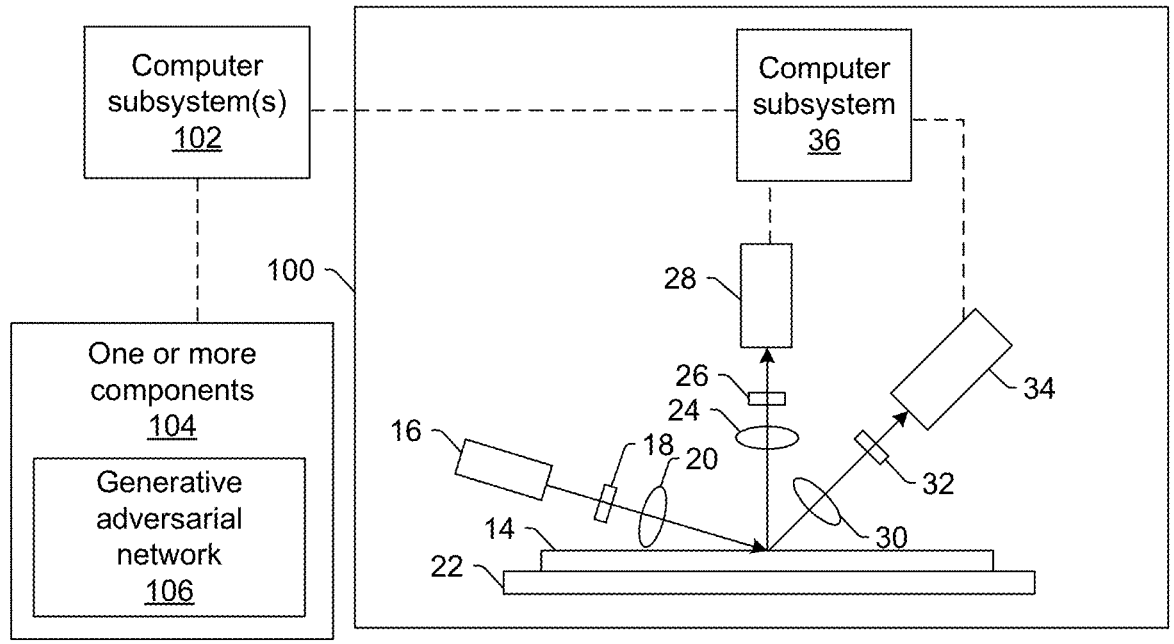
FIGS. 1 and 1a are schematic diagrams illustrating side views of embodiments of a system configured as described herein.

While the invention is susceptible to various modifications and alternative forms, specific embodiments thereof are shown by way of example in the drawings and are herein described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

The terms "design," "design data," and "design information" as used interchangeably herein generally refer to the physical design (layout) of an IC or other semiconductor device and data derived from the physical design through complex simulation or simple geometric and Boolean operations. The design may include any other design data or design data proxies described in commonly owned U.S. Pat. No. 7,570,796 issued on Aug. 4, 2009 to Zafar et al. and U.S. Pat. No. 7,676,077 issued on Mar. 9, 2010 to Kulkarni et al., both of which are incorporated by reference as if fully set forth herein. In addition, the design data can be standard cell library data, integrated layout data, design data for one or more layers, derivatives of the design data, and full or partial chip design data. Furthermore, the "design," "design data," and "design information" described herein refers to information and data that is generated by semiconductor device designers in a design process and is therefore available for use in the embodiments described herein well in advance of printing of the design on any physical specimens such as reticles and wafers.

"Nuisances" (which is sometimes used interchangeably with "nuisance defects" or "nuisance events") as that term is used herein is generally defined as defects that a user does not care about and/or events that are detected on a specimen but are not really actual defects on the specimen. Nuisances that are not actually defects may be detected as events due to non-defect noise sources on a specimen (e.g., grain in metal lines on the specimen, signals from underlaying layers or materials on the specimen, line edge roughness (LER), relatively small critical dimension (CD) variation in patterned features, thickness variations, etc.) and/or due to marginalities in the inspection system itself or its configuration used for inspection.

The term "defects of interest (DOIs)" as used herein is defined as defects that are detected on a specimen and are really actual defects on the specimen. Therefore, the DOIs are of interest to a user because users generally care about how many and what kind of actual defects are on specimens being inspected. In some contexts, the term "DOI" is used to refer to a subset of all of the actual defects on the specimen, which includes only the actual defects that a user cares about. For example, there may be multiple types of DOIs on any given specimen, and one or more of them may be of greater interest to a user than one or more other types. In the context of the embodiments described herein, however, the term "DOIs" is used to refer to any and all real defects on a specimen.

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals. Unless otherwise noted herein, any of the elements described and shown may include any suitable commercially available elements.

In general, the embodiments described herein include a generative adversarial network (GAN) or a type of GAN such as a conditional GAN (cGAN) for improved optical defect inspection performance and other applications. As described further herein, some embodiments create a new way to perform defect augmentation using a GAN or cGAN. Such embodiments therefore enable the use of learning techniques that are based on and/or require significant numbers of defect examples. The embodiments described herein may also or alternatively be configured and used for generating reference images for any test image for applications such as die-to-database type inspection.

In some embodiments, the specimen is a wafer. The wafer may include any wafer known in the semiconductor arts. Although some embodiments may be described herein with respect to a wafer or wafers, the embodiments are not limited in the specimens for which they can be used. For example, the embodiments described herein may be used for specimens such as reticles, flat panels, personal computer (PC) boards, and other semiconductor specimens.

One embodiment relates to a system configured to generate a simulated image of a specimen. One embodiment of such a system is shown in FIG. 1. The system includes one or more computer subsystems 102 and one or more components 104 executed by the one or more computer subsystems. In some embodiments, the system includes an inspection system coupled to the one or more computer subsystems. For example, in FIG. 1, the system includes inspection system 100 coupled to computer subsystems(s) 102. In the embodiments shown in FIG. 1, the inspection system is configured as a light-based inspection system. However, in other embodiments described herein, the inspection system is configured as an electron beam or charged particle beam inspection system.

In general, the inspection systems described herein include at least an energy source, a detector, and a scanning subsystem. The energy source is configured to generate energy that is directed to a specimen by the inspection system. The detector is configured to detect energy from the specimen and to generate output responsive to the detected energy. The scanning subsystem is configured to change a position on the specimen to which the energy is directed and from which the energy is detected.

In a light-based inspection system, the energy directed to the specimen includes light, and the energy detected from the specimen includes light. In the embodiment of the system shown in FIG. 1, the inspection system includes an illumination subsystem configured to direct light to specimen 14. The illumination subsystem includes at least one light source, e.g., as shown in FIG. 1, light source 16. The illumination subsystem may be configured to direct the light to the specimen at one or more angles of incidence, which may include one or more oblique angles and/or one or more normal angles. For example, as shown in FIG. 1, light from light source 16 is directed through optical element 18 and then lens 20 to specimen 14 at an oblique angle of incidence. The oblique angle of incidence may include any suitable oblique angle of incidence, which may vary depending on, for instance, characteristics of the specimen and the defects to be detected on the specimen.

The illumination subsystem may be configured to direct the light to the specimen at different angles of incidence at different times. For example, the inspection system may be configured to alter one or more characteristics of one or more elements of the illumination subsystem such that the light can be directed to the specimen at an angle of incidence that is different than that shown in FIG. 1. In one such example, the inspection system may be configured to move light source 16, optical element 18, and lens 20 such that the light is directed to the specimen at a different oblique angle of incidence or a normal (or near normal) angle of incidence.

In some instances, the inspection system may be configured to direct light to the specimen at more than one angle of incidence at the same time. For example, the illumination subsystem may include more than one illumination channel, one of the illumination channels may include light source 16, optical element 18, and lens 20 as shown in FIG. 1 and another of the illumination channels (not shown) may include similar elements, which may be configured differently or the same, or may include at least a light source and possibly one or more other components such as those described further herein. If such light is directed to the specimen at the same time as the other light, one or more characteristics (e.g., wavelength, polarization, etc.) of the light directed to the specimen at different angles of incidence may be different such that light resulting from illumination of the specimen at the different angles of incidence can be discriminated from each other at the detector(s).

In another instance, the illumination subsystem may include only one light source (e.g., source 16 shown in FIG. 1) and light from the light source may be separated into different optical paths (e.g., based on wavelength, polarization, etc.) by one or more optical elements (not shown) of the illumination subsystem. Light in each of the different optical paths may then be directed to the specimen. Multiple illumination channels may be configured to direct light to the specimen at the same time or at different times (e.g., when different illumination channels are used to sequentially illuminate the specimen). In another instance, the same illumination channel may be configured to direct light to the specimen with different characteristics at different times. For example in some instances, optical element 18 may be configured as a spectral filter and the properties of the spectral filter can be changed in a variety of different ways (e.g., by swapping out one spectral filter with another) such that different wavelengths of light can be directed to the specimen at different times. The illumination subsystem may have any other suitable configuration known in the art for directing the light having different or the same characteristics to the specimen at different or the same angles of incidence sequentially or simultaneously.

Light source 16 may include a broadband plasma (BBP) light source. In this manner, the light generated by the light source and directed to the specimen may include broadband light. However, the light source may include any other suitable light source such as a laser. The laser may include any suitable laser known in the art and may be configured to generate light at any suitable wavelength(s) known in the art. The laser may be configured to generate light that is monochromatic or nearly-monochromatic. In this manner, the laser may be a narrowband laser. The light source may also include a polychromatic light source that generates light at multiple discrete wavelengths or wavebands.

Light from optical element 18 may be focused onto specimen 14 by lens 20. Although lens 20 is shown in FIG. 1 as a single refractive optical element, in practice, lens 20 may include a number of refractive and/or reflective optical elements that in combination focus the light from the optical element to the specimen. The illumination subsystem shown in FIG. 1 and described herein may include any other suitable optical elements (not shown). Examples of such optical elements include, but are not limited to, polarizing component(s), spectral filter(s), spatial filter(s), reflective optical element(s), apodizer(s), beam splitter(s), aperture(s), and the like, which may include any such suitable optical elements known in the art. In addition, the system may be configured to alter one or more of the elements of the illumination subsystem based on the type of illumination to be used for inspection.

The inspection system also includes a scanning subsystem configured to change the position on the specimen to which the light is directed and from which the light is detected and possibly to cause the light to be scanned over the specimen. For example, the inspection system may include stage 22 on which specimen 14 is disposed during inspection. The scanning subsystem may include any suitable mechanical and/or robotic assembly (that includes stage 22) that can be configured to move the specimen such that the light can be directed to and detected from different positions on the specimen. In addition, or alternatively, the inspection system may be configured such that one or more optical elements of the inspection system perform some scanning of the light over the specimen such that the light can be directed to and detected from different positions on the specimen. In instances in which the light is scanned over the specimen, the light may be scanned over the specimen in any suitable fashion such as in a serpentine-like path or in a spiral path.

The inspection system further includes one or more detection channels. At least one of the detection channel(s) includes a detector configured to detect light from the specimen due to illumination of the specimen by the system and to generate output responsive to the detected light. For example, the inspection system shown in FIG. 1 includes two detection channels, one formed by collector 24, element 26, and detector 28 and another formed by collector 30, element 32, and detector 34. As shown in FIG. 1, the two detection channels are configured to collect and detect light at different angles of collection. In some instances, both detection channels are configured to detect scattered light, and the detection channels are configured to detect light that is scattered at different angles from the specimen. However, one or more of the detection channels may be configured to detect another type of light from the specimen (e.g., reflected light).

As further shown in FIG. 1, both detection channels are shown positioned in the plane of the paper and the illumination subsystem is also shown positioned in the plane of the paper. Therefore, in this embodiment, both detection channels are positioned in (e.g., centered in) the plane of incidence. However, one or more of the detection channels may be positioned out of the plane of incidence. For example, the detection channel formed by collector 30, element 32, and detector 34 may be configured to collect and detect light that is scattered out of the plane of incidence. Therefore, such a detection channel may be commonly referred to as a "side" channel, and such a side channel may be centered in a plane that is substantially perpendicular to the plane of incidence.

Although FIG. 1 shows an embodiment of the inspection system that includes two detection channels, the inspection system may include a different number of detection channels (e.g., only one detection channel or two or more detection channels). In one such instance, the detection channel formed by collector 30, element 32, and detector 34 may form one side channel as described above, and the inspection system may include an additional detection channel (not shown) formed as another side channel that is positioned on the opposite side of the plane of incidence. Therefore, the inspection system may include the detection channel that includes collector 24, element 26, and detector 28 and that is centered in the plane of incidence and configured to collect and detect light at scattering angle(s) that are at or close to normal to the specimen surface. This detection channel may therefore be commonly referred to as a "top" channel, and the inspection system may also include two or more side channels configured as described above. As such, the inspection system may include at least three channels (i.e., one top channel and two side channels), and each of the at least three channels has its own collector, each of which is configured to collect light at different scattering angles than each of the other collectors.

As described further above, each of the detection channels included in the inspection system may be configured to detect scattered light. Therefore, the inspection system shown in FIG. 1 may be configured for dark field (DF) inspection of specimens. However, the inspection system may also or alternatively include detection channel(s) that are configured for bright field (BF) inspection of specimens. In other words, the inspection system may include at least one detection channel that is configured to detect light specularly reflected from the specimen. Therefore, the inspection systems described herein may be configured for only DF, only BF, or both DF and BF inspection. Although each of the collectors are shown in FIG. 1 as single refractive optical elements, it is to be understood that each of the collectors may include one or more refractive optical element(s) and/or one or more reflective optical element(s).

The one or more detection channels may include any suitable detectors known in the art such as photo-multiplier tubes (PMTs), charge coupled devices (CCDs), and time delay integration (TDI) cameras. The detectors may also include non-imaging detectors or imaging detectors. If the detectors are non-imaging detectors, each of the detectors may be configured to detect certain characteristics of the light such as intensity but may not be configured to detect such characteristics as a function of position within the imaging plane. As such, the output that is generated by each of the detectors included in each of the detection channels may be signals or data, but not image signals or image data.

In such instances, a computer subsystem such as computer subsystem 36 of the inspection system may be configured to generate images of the specimen from the non-imaging output of the detectors. However, in other instances, the detectors may be configured as imaging detectors that are configured to generate imaging signals or image data. Therefore, the inspection system may be configured to generate images in a number of ways.

It is noted that FIG. 1 is provided herein to generally illustrate a configuration of an inspection system that may be included in the system embodiments described herein. Obviously, the inspection system configuration described herein may be altered to optimize the performance of the inspection system as is normally performed when designing a commercial inspection system. In addition, the systems described herein may be implemented using an existing inspection system (e.g., by adding functionality described herein to an existing inspection system) such as the 29xx/39xx series of tools that are commercially available from KLA Corp., Milpitas, Calif. For some such systems, the methods described herein may be provided as optional functionality of the inspection system (e.g., in addition to other functionality of the inspection system). Alternatively, the inspection system described herein may be designed "from scratch" to provide a completely new inspection system.

Computer subsystem 36 may be coupled to the detectors of the inspection system in any suitable manner (e.g., via one or more transmission media, which may include "wired" and/or "wireless" transmission media) such that the computer subsystem can receive the output generated by the detectors. Computer subsystem 36 may be configured to perform a number of functions using the output of the detectors. For instance, the computer subsystem may be configured to detect events on the specimen using the output of the detectors. Detecting the events on the specimen may be performed by applying some defect detection algorithm and/or method to the output generated by the detectors, which may include any suitable algorithm and/or method known in the art. For example, the computer subsystem may compare the output of the detectors to a threshold. Any output having values above the threshold may be identified as an event (e.g., a potential defect) while any output having values below the threshold may not be identified as an event.

The computer subsystem of the inspection system may be further configured as described herein. For example, computer subsystem 36 may be part of the one or more computer subsystems described herein or may be configured as the one or more computer subsystems described herein. In particular, computer subsystem 36 may be configured to perform the steps described herein. As such, the steps described herein may be performed "on-tool," by a computer system or subsystem that is part of an inspection system.

The computer subsystem of the inspection system (as well as other computer subsystems described herein) may also be referred to herein as computer system(s). Each of the computer subsystem(s) or system(s) described herein may take various forms, including a personal computer system, image computer, mainframe computer system, workstation, network appliance, Internet appliance, or other device. In general, the term "computer system" may be broadly defined to encompass any device having one or more processors, which executes instructions from a memory medium. The computer subsystem(s) or system(s) may also include any suitable processor known in the art such as a parallel processor. In addition, the computer subsystem(s) or system(s) may include a computer platform with high speed processing and software, either as a standalone or a networked tool.

If the system includes more than one computer subsystem, then the different computer subsystems may be coupled to each other such that images, data, information, instructions, etc. can be sent between the computer subsystems. For example, computer subsystem 36 may be coupled to computer subsystems(s) 102 as shown by the dashed line in FIG. 1 by any suitable transmission media, which may include any suitable wired and/or wireless transmission media known in the art. Two or more of such computer subsystems may also be effectively coupled by a shared computer-readable storage medium (not shown).

Although the inspection system is described above as being an optical or light-based inspection system, in another embodiment, the inspection system is configured as an electron beam inspection system. In an electron beam inspection system, the energy directed to the specimen includes electrons, and the energy detected from the specimen includes electrons. In one such embodiment shown in FIG. 1a, the inspection system includes electron column 122, and the system includes computer subsystem 124 coupled to the inspection system. Computer subsystem 124 may be configured as described above. In addition, such an inspection system may be coupled to another one or more computer subsystems in the same manner described above and shown in FIG. 1.

Figure 1A:
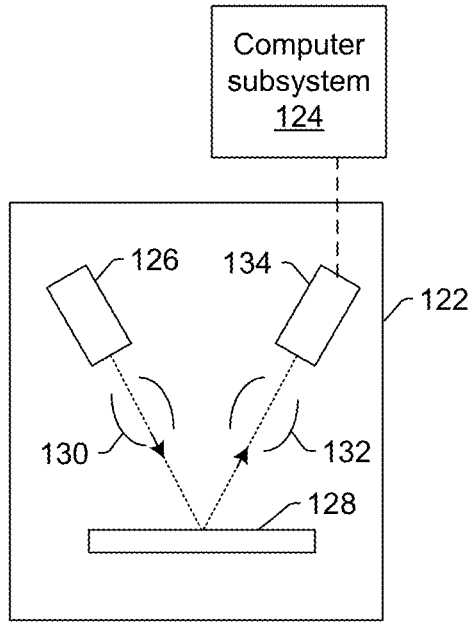

As also shown in FIG. 1a, the electron column includes electron beam source 126 configured to generate electrons that are focused to specimen 128 by one or more elements 130. The electron beam source may include, for example, a cathode source or emitter tip, and one or more elements 130 may include, for example, a gun lens, an anode, a beam limiting aperture, a gate valve, a beam current selection aperture, an objective lens, and a scanning subsystem, all of which may include any such suitable elements known in the art.

Electrons returned from the specimen (e.g., secondary electrons) may be focused by one or more elements 132 to detector 134. One or more elements 132 may include, for example, a scanning subsystem, which may be the same scanning subsystem included in element(s) 130.

The electron column may include any other suitable elements known in the art. In addition, the electron column may be further configured as described in U.S. Pat. No. 8,664,594 issued Apr. 4, 2014 to Jiang et al., U.S. Pat. No. 8,692,204 issued Apr. 8, 2014 to Kojima et al., U.S. Pat. No. 8,698,093 issued Apr. 15, 2014 to Gubbens et al., and U.S. Pat. No. 8,716,662 issued May 6, 2014 to MacDonald et al., which are incorporated by reference as if fully set forth herein.

Although the electron column is shown in FIG. 1a as being configured such that the electrons are directed to the specimen at an oblique angle of incidence and are scattered from the specimen at another oblique angle, the electron beam may be directed to and scattered from the specimen at any suitable angles. In addition, the electron beam inspection system may be configured to use multiple modes to generate output for the specimen as described further herein (e.g., with different illumination angles, collection angles, etc.). The multiple modes of the electron beam inspection system may be different in any output generation parameters of the inspection system.

Computer subsystem 124 may be coupled to detector 134 as described above. The detector may detect electrons returned from the surface of the specimen thereby forming electron beam images of (or other output for) the specimen. The electron beam images may include any suitable electron beam images. Computer subsystem 124 may be configured to detect events on the specimen using output generated by detector 134, which may be performed as described above or in any other suitable manner. Computer subsystem 124 may be configured to perform any additional step(s) described herein. A system that includes the inspection system shown in FIG. 1a may be further configured as described herein.

It is noted that FIG. 1a is provided herein to generally illustrate a configuration of an electron beam inspection system that may be included in the embodiments described herein. As with the optical inspection system described above, the electron beam inspection system configuration described herein may be altered to optimize the performance of the inspection system as is normally performed when designing a commercial inspection system. In addition, the systems described herein may be implemented using an existing inspection system (e.g., by adding functionality described herein to an existing inspection system) such as the tools that are commercially available from KLA. For some such systems, the methods described herein may be provided as optional functionality of the system (e.g., in addition to other functionality of the system). Alternatively, the system described herein may be designed "from scratch" to provide a completely new system.

Although the inspection system is described above as being a light or electron beam inspection system, the inspection system may be an ion beam inspection system. Such an inspection system may be configured as shown in FIG. 1a except that the electron beam source may be replaced with any suitable ion beam source known in the art. In addition, the inspection system may include any other suitable ion beam imaging system such as those included in commercially available focused ion beam (FIB) systems, helium ion microscopy (HIM) systems, and secondary ion mass spectroscopy (SIMS) systems.

As further noted above, the inspection system may be configured to have multiple modes. In general, a "mode" is defined by the values of parameters of the inspection system used to generate output for the specimen. Therefore, modes that are different may be different in the values for at least one of the optical or electron beam parameters of the inspection system (other than position on the specimen at which the output is generated). For example, for a light-based inspection system, different modes may use different wavelengths of light. The modes may be different in the wavelengths of light directed to the specimen as described further herein (e.g., by using different light sources, different spectral filters, etc.) for different modes. In another embodiment, different modes may use different illumination channels. For example, as noted above, the inspection system may include more than one illumination channel. As such, different illumination channels may be used for different modes.

The multiple modes may also be different in illumination and/or collection/detection. For example, as described further above, the inspection system may include multiple detectors. Therefore, one of the detectors may be used for one mode and another of the detectors may be used for another mode. Furthermore, the modes may be different from each other in more than one way described herein (e.g., different modes may have one or more different illumination parameters and one or more different detection parameters). The inspection system may be configured to scan the specimen with the different modes in the same scan or different scans, e.g., depending on the capability of using multiple modes to scan the specimen at the same time.

The systems described herein may be configured as another type of semiconductor-related process/quality control type system such as a defect review system and a metrology system. For example, the embodiments of the systems described herein and shown in FIGS. 1 and 1a may be modified in one or more parameters to provide different imaging capability depending on the application for which they will be used. In one embodiment, the electron beam inspection system configuration described herein may be modified to be configured as an electron beam defect review system. For example, the system shown in FIG. 1a may be configured to have a higher resolution if it is to be used for defect review or metrology rather than for inspection. In other words, the embodiments of the system shown in FIGS. 1 and 1a describe some general and various configurations for a system that can be tailored in a number of manners that will be obvious to one skilled in the art to produce systems having different imaging capabilities that are more or less suitable for different applications.

As noted above, the inspection systems may be configured for directing energy (e.g., light, electrons) to and/or scanning energy over a physical version of the specimen thereby generating actual images for the physical version of the specimen. In this manner, the inspection systems may be configured as "actual" imaging systems, rather than "virtual" systems. A storage medium (not shown) and computer subsystem(s) 102 shown in FIG. 1 may be configured as a "virtual" system. Systems and methods configured as "virtual" inspection systems are described in commonly assigned U.S. Pat. No. 8,126,255 issued on Feb. 28, 2012 to Bhaskar et al. and U.S. Pat. No. 9,222,895 issued on Dec. 29, 2015 to Duffy et al., both of which are incorporated by reference as if fully set forth herein. The embodiments described herein may be further configured as described in these patents.

The one or more components executed by the one or more computer subsystems include generative adversarial network (GAN) 106 shown in FIG. 1. The GAN is trained with a training set that includes portions of design data for one or more specimens designated as training inputs and corresponding images of the one or more specimens designated as training outputs. The GAN may or may not be trained by the one or more computer subsystems and/or one of the component(s) executed by the computer subsystem(s). For example, another method or system may train the GAN, which then may be stored for use as the components executed by the computer subsystem(s).

Figure 2:
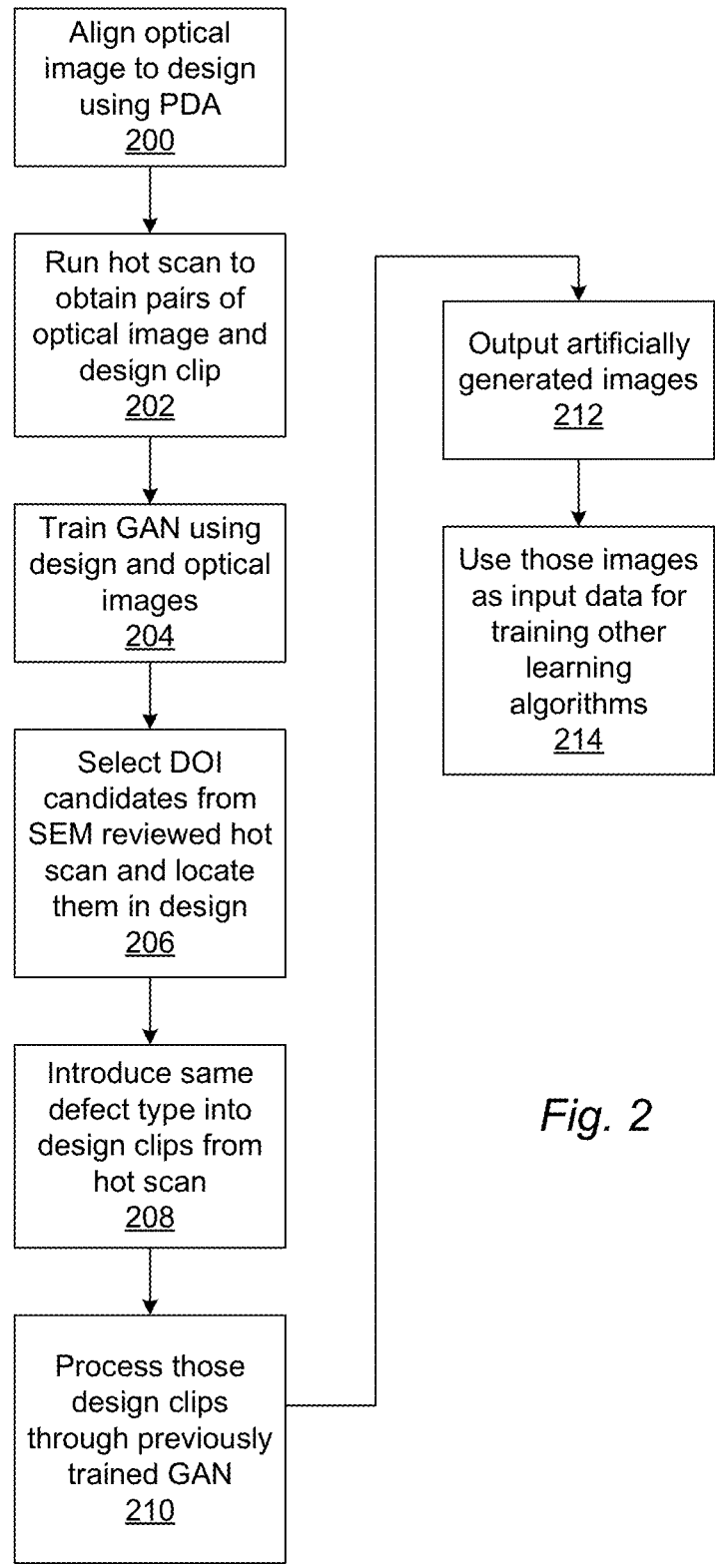
FIGS. 2-4 are flow charts illustrating steps that may be performed by the embodiments described herein.

Some steps that may be performed by the one or more computer subsystems to train the GAN are shown in FIG. 2. Although FIG. 2 shows steps that may be performed in a method for using a GAN for data augmentation, some of the steps shown in FIG. 2 may be performed for other applications as well. For example, steps 200, 202, and 204 may be performed to train a GAN regardless of which of the applications described herein the GAN will be used for.

As shown in step 200, the computer subsystem(s) may align optical image to design using pixel-to-design alignment (PDA). If the GAN is being trained for a different kind of image, the optical image(s) may be replaced in the steps shown in FIG. 2 with another type of (e.g., electron beam) image. PDA may be performed in any suitable manner known in the art, some examples of which are described in the above-referenced patent to Kulkarni et al. PDA may be performed for any one or more alignment target(s) on the specimen to thereby determine image-to-design offsets, which can be then be used by the computer subsystem(s) to identify which portion of a design for the specimen corresponds to an image generated for the specimen and/or an event detected on the specimen.

As shown in step 202, the computer subsystem(s) may run a hot scan to obtain pairs of optical image and design clip. A "design clip" as that term is used herein is generally defined as a relatively small portion of an entire design for a specimen. The term "design clip" is used interchangeably herein with the phrase "portion of design data." The hot scan may be performed in any suitable manner known in the art. In general, a "hot" scan involves scanning a specimen and detecting events on the specimen using a "hot" threshold, e.g., a threshold that is at, near, or even in the noise floor of the output generated by the scanning. For any events that are detected in the hot scan, the computer subsystem(s) may create pairs of optical images and their corresponding design clips. The pairs may be created for only some or all of the events detected in the hot scan. In general, the pairs may be created for fewer than all of the events because hot scans generally will detect many more events than are needed for any one application. The computer subsystem(s) may sample or select which events are used to create image and design clip pairs in any suitable manner. The image and design clip pairs may also be created for locations at which no events were detected. In this manner, the training set may include image and design clip pairs for "good" locations on the specimen(s). In some such embodiments, the hot scan may not detect events on the specimen at all, but may simply collect images that can then be paired with corresponding design clips. Whether for events or not, the corresponding images and design clips can be identified and paired using the image-to-design offsets described above.

The image and design clip pairs generated by step 202 may then be used as a training set, with the design clips designated as the training inputs and corresponding images designed as the training outputs, in step 204 in which the GAN (i.e., the generator-discriminator network (NW)) is trained using design and optical images. The training of the GAN may be performed as described further herein. In some embodiments, the computer subsystem(s) may be configured to perform steps 200, 202, and 204. As another alternative, different computer subsystem(s) or system(s) may be configured to perform steps 200, 202, and 204. For example, a first computer subsystem may be configured to generate the training set by performing steps 200 and 202, a second computer subsystem may be configured to train the GAN in step 204, and the first and second computer subsystems may or may not be included in the computer subsystem(s) of the embodiments described herein.

The training may include inputting the training inputs into the GAN and altering one or more parameters of the GAN until the output produced by the GAN matches (or substantially matches) the training outputs. Training may include altering any one or more trainable parameters of the GAN. For example, the one or more parameters of the GAN that are trained by the embodiments described herein may include one or more weights for any layer of the GAN that has trainable weights. In one such example, the weights may include weights for convolution layers but not pooling layers.

In one embodiment, the GAN is configured as a conditional GAN (cGAN). In general, GANs consist of two adversarial models, a generative model, G, capturing the data distribution, and a discriminative model, D, estimating the probability that a given sample comes from the training data rather than G. G and D could be a multi-layer perceptron, i.e. a non-linear mapping function. The generator builds a mapping function from a prior noise distribution $p_z(Z)$ to the data space $G(z; \theta_g)$ in order to learn a generator distribution $p_g$ over the data x where G is a differentiable function represented by a multilayer perceptron with parameters $\theta_g$. The generator is trained to produce images that cannot be distinguished from real images. The adversarially trained discriminator is trained to detect fakes which are created by the generator. Both the generator and the discriminator are trained as good as possible so that the generator produces extremely good "faked" images.

When extending GANs to a conditional model (cGAN), the discriminator and the generator are both conditioned on some extra information, y, by feeding y into the discriminator and the generator as additional input layer.

GANs are inspired by game theory where a generator G and a critic, i.e., Discriminator D, are competing with each other to make each other stronger. The goal is to make the generated data distribution $p_g$ as similar as possible to the real sample distribution $p_r$ evaluated by the Jensen-Shannon divergence:

$$D_{JS}(p_g \| p_r) = \frac{1}{2} D_{KL}\left(p_g \| \frac{p_g + p_r}{2}\right) + \frac{1}{2} D_{KL}\left(p_r \| \frac{p_g + p_r}{2}\right)$$

where $D_{KL}$ is the Kullback-Leibler divergence defined as follows:

$$D_{KL}\left(p_g \| \frac{p_g + p_r}{2}\right) = \int_{x_1}^{x_2} p_g(x) \log \frac{2 p_g(x)}{p_g(x) + p_r(x)} dx \text{ and}$$

$$D_{KL}\left(p_r \| \frac{p_g + p_r}{2}\right) = \int_{x_1}^{x_2} p_r(x) \log \frac{2 p_r(x)}{p_g(x) + p_r(x)} dx$$

The generator outputs synthetic samples given a random noise variable input z. Over time, the generator gets trained to capture the real data distribution by having the discriminator reject images which it considers as being bad fakes.

For conditional GANs, the Generator and Discriminator are conditioned on some extra information, y, which will be the design clip in the embodiments described herein. The following minimax game with the objective L(D,G) is describing the setting:

$$\min_G \max_D L(D, G) = \mathbb{E}_{x \sim p_r(x)}(\log D(x \mid y)) + \mathbb{E}_{z \sim p_z}(\log(1 - D(G(z \mid y)))$$

$$= \mathbb{E}_{x \sim p_r(x)}(\log D(x \mid y)) + E_{x \sim p_g(x)}(\log(1 - D(x \mid y)))$$

This means that G is trained to increase chances of D producing a high probability for a faked example, thus minimizing $\mathbb{E}_{x \sim p_g(x)}(\log(1-D(x|y)))$. We also need to make sure that the discriminator decisions over real data are accurate by maximizing the encoding $\mathbb{E}_{x \sim p_r(x)}(\log D(x|y))$ and given a fake sample G(z), the discriminator is expected to output a probability, D(G(z)), close to zero by maximizing $\mathbb{E}_{z \sim p_z(z)}(\log(1-D(G(z|y)))$.

Figure 3:
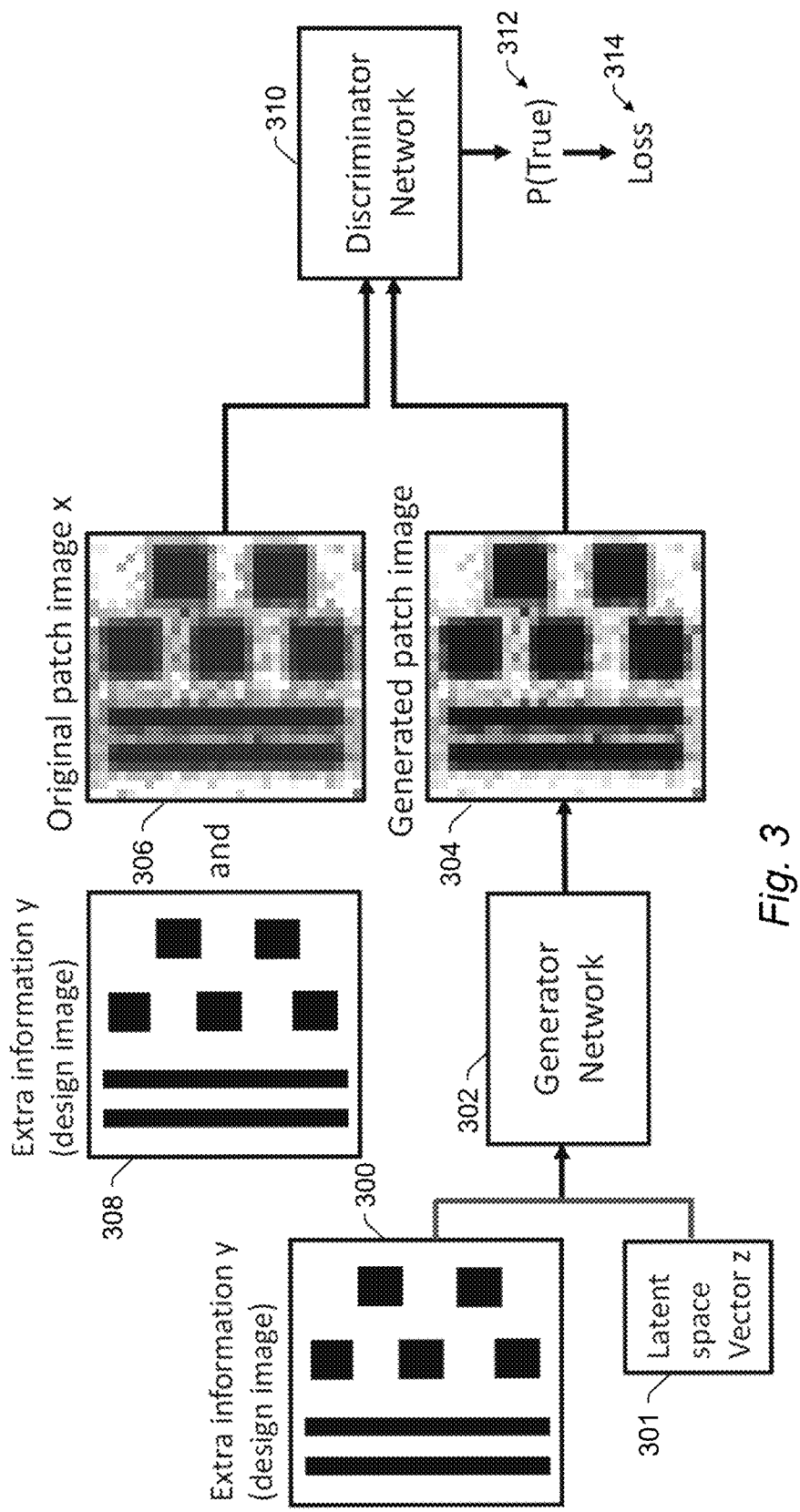

FIG. 3 shows cGAN training performed by providing the generator with a design image. In particular, as shown in FIG. 3, extra information y 300 (a design image or conditional image) is input to generator network 302 along with latent space vector z 301. As a result, generator network 302 outputs generated patch image 304. Original patch image x 306, in this case, is an actual optical image of a specimen at the location on the specimen at which the portion of the design shown in design image 300 is formed. In this manner, extra information y 300 such as a design image may be a training input in a training set, and original patch image x 306 may be its corresponding image of a specimen designated as a training output in the training set. Generated patch image 304 and extra information y 300 are combined as a first input to discriminator network 310. Original patch image x 306 and extra information y 308 (a design image) are combined as a second input to discriminator network 310. Extra information y 300 and 308 are merely different instances of the same portion of the same design in this case. The discriminator network may generate output P(True) 312, which is the probability that the generated patch image is a true or good "faked" image. P(True) may be input to loss function 314.

Each of the design images, original patch images, and generated patch images shown in the figures is not meant to illustrate any particular specimen(s) or characteristics thereof for which the embodiments described herein may be used. In a similar manner, each of the original patch images and generated patch images shown in the figures is not meant to illustrate any particular actual or simulated images that may be generated for specimen(s). Instead, the design images, original patch images, and generated patch images shown in the figures are merely intended to promote understanding of the embodiments described herein. The images actually input and output from the generator will vary depending on the specimen and its characteristics, which are related to its design, and the configuration of the imaging system that generates the actual images for the specimen(s), which are used to train the GAN thereby affecting the simulated images that are generated by the GAN.

Loss function 314 may be any suitable loss function known in the art such as that disclosed by Isola et al., in "Image-to-Image Translation with Conditional Adversarial Networks," The IEEE Conference on Computer Vision and Pattern Recognition (CVPR), 2017, pp. 1125-1134, which is incorporated by reference as if fully set forth herein. The embodiments described herein may be further configured as described in this reference.

Figure 5:
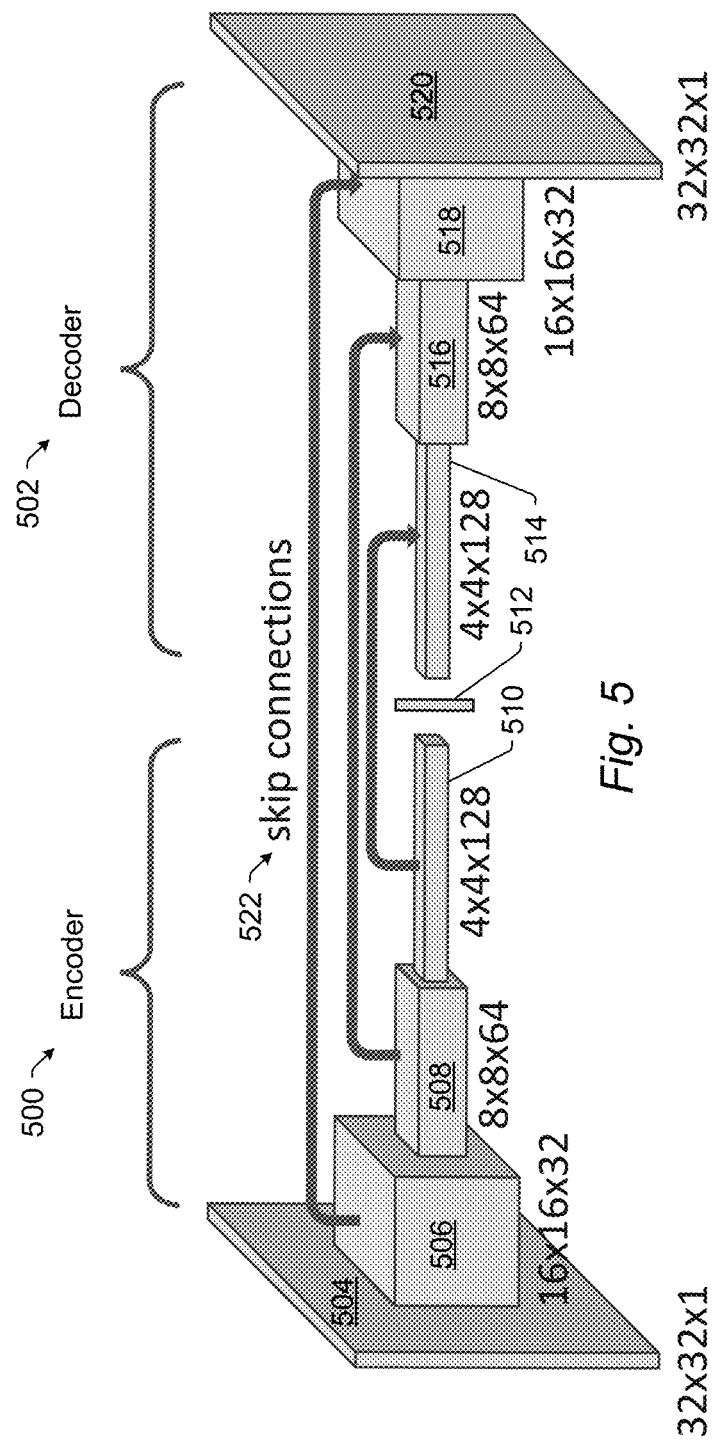
FIG. 5 is a schematic diagram illustrating one example of a generator that may be included in an embodiment of a generative adversarial network (GAN)

An example of a generator that may be included in embodiments of a GAN configured as described herein is shown in FIG. 5. In general, the GAN may include an encoder-decoder network that is progressively down sampling until a bottle neck layer and then the process is reversed. As shown in FIG. 5, the generator may include encoder 500 and decoder 502. Each of the blocks 506, 508, and 510 shown in encoder 500 represent an example of final output layer size after repeated convolution, batch normalization, and rectified linear unit (ReLU) activation and applying max pooling in the end of each section. Although encoder 500 is shown in FIG. 5 as including 3 blocks, the encoder may include any suitable number of blocks, which may be determined in any suitable manner known in the art. In addition, each of the blocks, convolution layer(s), batch normalization layer(s), ReLU layer(s), and pooling layer(s) may have any suitable configuration known in the art. Input 504, which is in the embodiments described herein a portion of design data, may be input into block 506, whose output may be input to block 508, and so on. The encoder may generate feature layer 512.

The decoder may also include multiple blocks that perform different functions on feature layer 512 input to the decoder. Each of blocks 514, 516, and 518 in the decoder represent an example of final output layer size after repeating upsampling (transposed convolution) and ReLU activation. Although decoder 502 is shown in FIG. 5 as including 3 blocks, the decoder may include any suitable number of blocks, which may be determined in any suitable manner known in the art. Each of the blocks and upsampling and ReLU layer(s) included in the decoder may have any suitable configuration known in the art. Feature layer 512 generated by the encoder may be input to block 514, whose output may be input to block 516, and so on. Output 520 of the decoder may be any of the simulated images described herein.

In some instances, the GAN may include skip connections 522 between corresponding blocks in the encoder and decoder, e.g., between blocks 506 and 518, between blocks 508 and 516, and between blocks 510 and 514. Connections can be skipped to transfer low-level information that has been learned between the blocks. The skip connections may have any suitable configuration determined in any suitable manner known in the art. The numbers below the input and output in FIG. 5 indicate the size of the input and output, respectively. The numbers below the blocks in the encoder indicate the size of the outputs of the blocks, and the numbers below the blocks in the decoder indicate the size of the inputs to each of the blocks.

Figure 6:
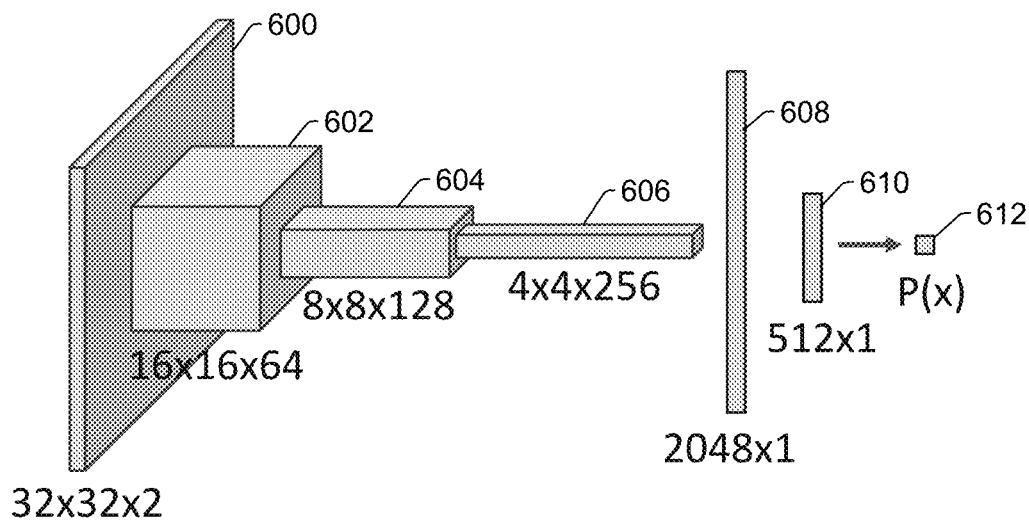
FIG. 6 is a schematic diagram illustrating one example of a discriminator that may be included in an embodiment of a GAN.

An example of a discriminator that may be included in embodiments of a GAN configured as described herein is shown in FIG. 6. Input 600 to the discriminator may include two images (not shown in FIG. 6), one generated by the generator of the GAN and the original image. The discriminator may include a number of layers including layers 602, 604, 606, 608, and 610, each of which may include some combination of convolution, ReLU, and max pooling layers. The convolution, ReLU, and max pooling layers may have any suitable configuration known in the art. Output 612 of the discriminator may be P(x), the probability of how well the simulated image matches the original image or the probability that the simulated image is a good "faked" image or a bad "faked" image. The numbers below the input in FIG. 6 indicate the size of the input. The numbers below the layers in the discriminator indicate the size of the outputs of the layers. Although the discriminator is shown in FIG. 6 with a particular number of layers, the discriminator included in the GANs of the embodiments described herein may have any suitable number of layers determined in any suitable manner known in the art.

Additional description of the general architecture and configuration of GANs and cGANs can be found in "Generative Adversarial Nets" Goodfellow et al., arXiv: 1406.2661, Jun. 10, 2014, 9 pages and "Conditional Generative Adversarial Nets," Mirza et al., arXiv:1411.1784, Nov. 6, 2014, 7 pages, which are incorporated by reference as if fully set forth herein. The embodiments described herein may be further configured as described in these references.

The one or more computer subsystems are configured for generating a simulated image for a specimen by inputting a portion of design data for the specimen into the GAN. The computer subsystem(s) may be configured to input the portion of the design data for the specimen into the GAN in any suitable manner known in the art. Although some embodiments are described herein (only for the sake of clarity and simplicity) as generating "a simulated image" for a specimen, the GANs described herein may be used to generate any number of simulated images limited only by the portions of design data input to the GANs. In addition, although some embodiments are described herein (again only for the sake of clarity and simplicity) as generating a simulated image for "a specimen," the embodiments described herein are not limited to generating simulated image(s) for only one specimen. In some embodiments, generating simulated image(s) for only one specimen may be all that is required for some applications such as when the simulated image(s) are reference image(s) that can be used for inspection of multiple specimens or when the simulated image(s) are augmented defect images that are used to train another deep learning (DL) or machine learning (ML) model or network.

In one embodiment, the simulated image is a simulated optical image. In this manner, the simulated image illustrates how the specimen appears in one or more actual images generated by an optical imaging system such as an optical inspection system. As such, the simulated image(s) may represent (e.g., correspond, simulate, or approximate) images that may be generated of the specimen by an optical imaging system. Such simulated optical images may be used in a variety of ways described further herein for inspection applications. One novel feature of the embodiments described herein is therefore that they provide a method for improved optical defect inspection using a GAN or cGAN for the artificial creation of optical patch images.

In another embodiment, the specimen for which the simulated image is generated is not included in the one or more specimens. For example, the one or more specimens that are used to generate the training data that is then used to train a GAN may be different from the specimen for which the GAN is used to generate a simulated image. In this manner, the training data may be generated using one or more training specimens, and the simulated image may be generated for a "runtime" specimen. The training specimen(s) and the runtime specimen may be the same type of specimens, e.g., they may have the same design and may have been processed using the same fabrication process step(s), although as described further herein that is not necessarily always the case. In addition, the trained GAN may be used for generating simulated images for more than one runtime specimen.

In a further embodiment, a design for the specimen for which the simulated image is generated is different than one or more designs for the one or more specimens. For example, as described above, the specimen for which the simulated image is generated may not be the same as (or included in) the one or more specimens used to train the GAN. In general, the one or more specimens used to train the GAN and the specimen for which the image is simulated may have the same design and may have been processed in the same processes (and therefore be of the same "layer"). Training the GAN in such a manner will ensure that the simulated image(s) most closely resemble the actual images.

But in some cases, a first specimen may have similar enough characteristics (e.g., patterned features, materials, etc.) to a second specimen, that a GAN trained on the first specimen can be used to generate simulate image(s) for the second specimen even if the first and second specimens do not have the same designs. In such cases, the simulated image(s) that are generated by the trained GAN should be for the same optical mode as that for which it was trained. In other words, as described further herein, a GAN that is trained for generating simulated image(s) produced by one imaging mode may not necessarily be suitable for generating simulated image(s) produced by another imaging mode. Therefore, if two specimens that have at least some similarities in at least a portion of their designs are or will be imaged in the same manner, one of the specimens may be used to train the GAN and the trained GAN may be used to generate simulated image(s) for another of the specimens.

In this manner, a trained GAN may be repurposed for generating simulated image(s) for specimens it was not necessarily trained for. In one such example, if two different specimens with two different designs have at least some patterned features in common in a portion of the design (e.g., similar memory array areas) formed of similar materials and having the same or similar dimensions, a GAN trained for one of the specimens may be capable of producing simulated image(s) of synthetic defects in that portion of the design for another of the specimens. Even if a GAN trained for one specimen is not capable of producing simulated image(s) for another specimen having a different design, if there are some similarities among the specimens, the trained GAN may be used as starting configuration that is re-trained for another specimen to create a different GAN. Such re-training may be performed as described herein.

In one embodiment, the simulated image includes an augmented defect image of a synthetic defect. In this manner, the simulated image illustrates how a synthetic defect appears in one or more actual images generated by a tool such as an inspection system. As such, the simulated image(s) may represent (e.g., correspond, simulate, or approximate) image(s) that may be generated of the synthetic defect(s) by the inspection system or other tool. A "synthetic" defect as that term is used herein is generally defined as a defect that is artificially created in a design for a specimen in one of several manners described herein. Therefore, a "synthetic" defect is not a defect that has been detected on a specimen although its characteristics may be determined based on such a detected defect. Instead, such a "synthetic" defect is created in a design for a specimen through the intentional manipulation of an otherwise defect free portion of the design. When such a manipulated portion of the design is input to a trained GAN described herein, the resulting simulated image is referred to as an "augmented" defect image since the simulated specimen image has been augmented with a defect that is not actually present on the specimen.

Figure 4:
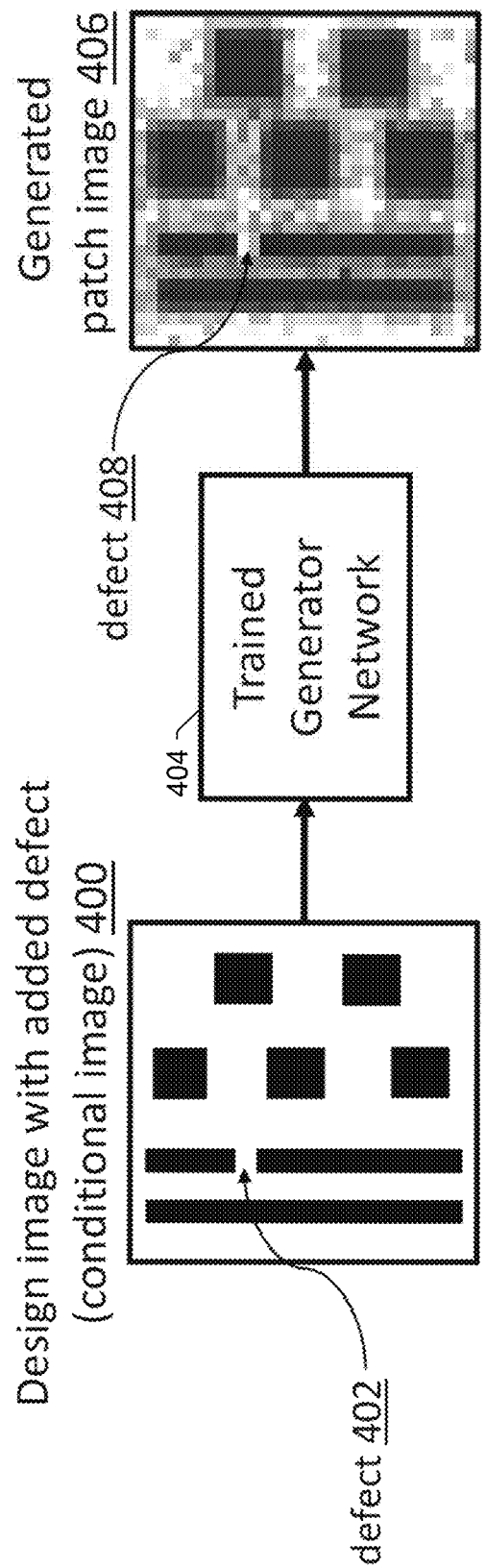

FIG. 4 illustrates one embodiment of steps that may be performed for artificial image generation using a GAN. In particular, as shown in FIG. 4, the one or more computer subsystems may input design image 400 (conditional image) with added defect 402 into trained generator network 404. The added or synthetic defect may be created in the design data portion shown in design image 400 as described further herein, which may be performed by the one or more computer subsystems or another system or method. The trained generator network may output generated patch image 406 showing defect 408. In this manner, the synthetic defect is added defect 402 in the portion of design data shown in design image 400, which is input to the GAN by the one or more computer subsystems to thereby generate simulated image 406.

As shown in FIG. 4, therefore, once the GAN is trained, the GAN can be used to generate simulated optical and other images. In this embodiment, the trained generator network is used to create a patch, real-looking image of an artificially introduced defect in a design clip. The generated patch images can then be used for data augmentation, e.g., to augment other non-simulated patch images and information to train another ML network, which may be performed as described further herein.

In one such embodiment, a number of actual defects detectable on the one or more specimens and the specimen by an inspection system is insufficient for training a ML model. For example, the embodiments described herein can be used to generate simulated image(s) that are augmented defect image(s) of synthetic defect(s) that can then be used to augment training data, which is particularly advantageous when the number of DOI events is limited which is very often the case. Another advantage of the embodiments described herein is therefore that they enable the use of ML techniques such as DL, random forest, etc. even when the original number of DOI examples is substantially low. The embodiments described herein also advantageously enable the use of ML techniques when there are no DOI examples available, e.g., as described further herein, when there are no optical images of a DOI at all, simulated images may be generated by the embodiments described herein based on knowledge of how the DOI is supposed to look in design space within design clip(s), and those simulated images may then be used to train a ML model.

In another such embodiment, the one or more computer subsystems are configured for generating the portion of the design data for the specimen input to the GAN by modifying original design data for the specimen with the synthetic defect. For example, as shown in step 206 of FIG. 2, the one or more computer subsystems may select DOI candidates from scanning electron microscope (SEM) reviewed hot scan and locate them in design. In one such example, if a hot scan is performed as shown in FIG. 2 for GAN training, events detected by the hot scan may be sampled and then sent for defect review, e.g., by a SEM or another suitable defect review tool. The defect review is performed to determine which of the sampled events are actual defects and which are nuisances and to determine a defect type or classification of the actual defects. In this manner, defect review may determine which of the detected events are DOIs and identify the type or classification of the DOI (when it is possible that different types of DOIs may be present on a specimen). Step 206 is an optional step since, in some cases, a user will know what type(s) of DOI(s) they are interested in. For example, a chip manufacturer will usually know what defects they are looking for.

As shown in step 208 of FIG. 2, the one or more computer subsystems may then introduce the same defect type into design clips from the hot scan. If the specimen for which the augmented defect image(s) are being generated has the same design as the one or more specimens used for generating the training set, then the design clips used for steps 200, 202, and 204 may also be used for step 208. If the specimen for which the augmented defect image(s) are being generated has a different design than the one or more specimens used for generating the training set, then the design clips used for steps 200, 202, and 204 may be different from those used for step 208.

In either case, however, the DOI(s) that are selected in step 206 may be used in step 208 to create design clip(s) that are modified to include the DOI(s). For example, if a bridge type DOI is selected in step 206, the original design data for the specimen may be modified by the computer subsystem(s) to include bridge type structure(s) at location(s) in the design that are different than the location at which the bridge type DOI was detected. The location(s) at which the DOI is created in a design may be selected based on the types of patterned features located at or near the detected DOI, e.g., so that the modified design clip and the original design clip at the location of a detected DOI contain the same or at least similar patterned structures (similar in shape, dimensions, spacing relative to each other, orientation, etc.). In one example, if a bridge type DOI is detected between two patterned features having a particular orientation and spacing relative to each other, a bridge type patterned feature may be created at any one or more other locations in the design containing the same two patterned features having the same relative orientation and spacing. Such locations may be identified in any suitable manner, e.g., by pattern searching the original design based on the image of the detected DOI or the original, defect-free design clip at the location of the detected DOI.

Modifying the original design data for the specimen may be performed as described herein using an electron design automation (EDA) tool. The EDA tool may include any suitable commercially available EDA tool. In addition, modifying the original design data as described herein can be automated with a programmable/graphical EDA editor, which may include any suitable EDA software, hardware, system, or method. In some such embodiments, one or more of the computer subsystems described herein (e.g., computer subsystem(s) 102) may be configured as an EDA tool or may be a computer subsystem included in an EDA tool.

If the original design data (e.g., computer-aided design (CAD)) for the specimen is available, it is straightforward to inject "legal," synthetic defect examples. For example, DOIs such as opens, shorts, "mouse bites," protrusions, etc. can be rendered (drawn) with various sizes, which could be automated based on descriptions of the DOIs. Using an EDA tool, these rendered DOIs can be located in "legal" places in the geometry instead of in random places. In one example, a short is a metal connection between two copper lines. For such a DOI, one could simply add a small short line at strategic pinch points in the design. When a user such as a chip manufacturer knows what defects they are looking for, they could also manually draw them in the design file.

Modifying the original design data for the specimen with the synthetic defect as described herein may also be performed using an inception module configured for altering the design to create the synthetic defect in the design. For example, a neural network may be trained by a defect hallucination system such as those suggested by GoogLeNet inception for natural scene images. A traditional neural network that is pre-trained on defects can then play these backwards to create new defect types on other geometry structures. Examples of systems and methods for performing GoogLeNet inception can be found in "Going Deeper with Convolutions," Szegedy et al., 2015 IEEE Conference on Computer Vision and Pattern Recognition (CVPR), June 2015, 9 pages, which is incorporated by reference as if fully set forth herein. The embodiments described herein may be further configured as described in this reference.

As shown in step 210, the one or more computer subsystems may then process the design clips generated by step 208 through the previously trained GAN. The trained GAN may then output artificially generated images, as shown in step 212. Among other things, the images output by the GAN in step 212 may be used as input data for training other learning algorithms, as shown in step 214, which may be performed as described further herein.

In some such embodiments, the one or more computer subsystems are configured for determining one or more characteristics of the synthetic defect based on one or more defects detected on the one or more specimens. For example, as described above, in some instances, events may be detected on the one or more specimens used for generating the training set that is used to train the GAN, and DOI(s) may be identified and selected from among those events. Information for the DOI(s) may then be used to determine one or more characteristics of the synthetic defects. Such information may include any information that is or can be determined for the DOI(s) such as location, size, shape, orientation, texture or roughness, patterned feature(s) on which the DOI(s) are located, patterned feature(s) in which the DOI(s) are located, patterned feature(s) located near the DOI(s), etc. Such information may be determined or generated by the inspection tool that detected the events, a review tool that re-detected the events and identified one or more of them as DOI(s), a metrology tool that measures one or more characteristics of the identified DOI(s), or some combination thereof. For example, as described above, pattern searching may be performed based on a defect image or its corresponding design clip to find other similar instances of a pattern in a design, and then the design for those other instances may be modified as described herein to create the DOI(s) at those other instances. Other DOI characteristic(s) such as those described above may also be used to create the modified design (e.g., in the case of a bridge type DOI, the dimensions, orientation, roughness, etc. of the bridge type structure). Therefore, the original design for the specimen may be modified based on one or more characteristics of one or more DOI(s) detected on the specimen(s) used to generate the training set.

In another such embodiment, the one or more computer subsystems are configured for determining one or more characteristics of the synthetic defect without information for one or more actual defects detected on the one or more specimens or the specimen. For example, even if there are no DOI examples at all, the one or more computer subsystems can modify a design clip for the specimen by introducing a defect in it and input the modified design clip into the GAN to create the corresponding patch image that can then be used to train a neural network for applications such as nuisance filtering. One novel feature of the embodiments described herein therefore is that they provide a method for improved optical defect inspection using a GAN or cGAN to modify a design file by introducing a defect in it and generating a corresponding optical patch image even when there are no defect examples at all.

When there are no defect examples at all, the one or more characteristics of the synthetic defect may be determined in various possible ways. For example, as described above, in many instances in which the embodiments described herein may be implemented, a user may have knowledge about which types of DOI(s) that are of interest to them. Such knowledge may be based on prior knowledge about the types of DOI(s) typically seen on specimens produced in the same or similar process(es) as the specimen for which the simulated image is generated. Such prior knowledge may be acquired experimentally, heuristically, theoretically, etc. For example, even when designs of specimens are substantially different, certain patterned structures that may be in each of the designs may be prone to certain type(s) of DOI(s). In one particular example, alternating line/space patterns in which the lines and spaces are relatively small in width may be prone to bridging type defects formed between the lines. Therefore, when a user sees such a pattern group in a new design, they may surmise that bridging type defects may be present in such patterns and therefore may create such defects in the design for the specimen. The design clips created artificially for such defects may then be input to the GAN by the computer subsystem(s) described herein to thereby generate simulated images for the defects.

In a further such embodiment, the synthetic defect is a first type of DOI, the one or more computer subsystems are configured for generating an additional portion of the design data for the specimen by modifying the original design data for the specimen with an additional synthetic defect, the additional synthetic defect is a second type of DOI different than the first type, and the one or more computer subsystems are configured for generating an additional simulated image for the specimen by inputting the additional portion of the design data into the GAN. For example, the embodiments described herein can advantageously be used to easily generate simulated images for different DOI type examples. In other words, the GANs described herein can generate simulated images for different types of DOIs in the same design for the same specimen.

Many of the specimens described herein may have multiple types of DOIs present on them, and the user may be interested in more than one (or even all) of those multiple types of DOIs. Different DOIs may have substantially different characteristics. For example, bridge type defects can have substantially different characteristics than pinhole type defects, but both types of defects may be present on a specimen and possibly of interest to a user. Different types of DOIs may be located in different portions of the design or in the same portion of the design. Therefore, a design clip that is modified as described herein to include a synthetic defect may include a single synthetic defect or multiple synthetic defects. Regardless of the number of synthetic defects in a modified design clip and/or the number of modified design clips, which may be for multiple instances of the same DOI type and/or for different DOI types, a GAN trained as described herein will be capable of producing substantially high quality simulated images for each of the DOI types and for each DOI instance.

In an additional such embodiment, the one or more computer subsystems are configured for determining one or more characteristics of the synthetic defect based on one or more defects detected on one or more additional specimens, the one or more additional specimens are formed in one or more process steps, a change in the one or more process steps occurs prior to the one or more process steps being used to form the specimen, a ML model was trained to perform one or more functions for the one or more additional specimens, and the one or more computer subsystems are configured to re-train the ML model using the simulated image. In this manner, one advantage of the embodiments described herein is that they can be used to mitigate process variation by generating images with DOI examples from a first wafer and image examples from a second wafer.

In one such example, suppose that a false positive filter, often referred to as a nuisance event filter or NEF, has been setup on wafer 1. In some instances, the process may change and thus defect attributes may change for a later wafer, referred to here simply as wafer 2. That change in defect attributes may mean that the filter setup on wafer 1 is useless for wafer 2 but also since wafer 2 was not the setup wafer, there may not be any defect examples for wafer 2 for retraining the filter. The implication here is that it will not be possible to train the NEF classifier, which could be, for example, a random forest model. However, the system embodiments described herein can solve this problem by collecting some image data on wafer 2, e.g., using an inspection system such as that described herein. In this case, no new DOI information is needed. The one or more computer subsystem(s) may then use these images from wafer 2 to train a new GAN or retrain the previously trained GAN, which may be performed as described further herein and shown in FIGS. 2 and 3, using design and corresponding patch images. The one or more computer subsystem(s) may then introduce a synthetic defect in a design clip to generate a modified design clip that can be input to the newly trained or retrained GAN to thereby generate a corresponding simulated defect image. Such simulated defect image(s) may be used as described further herein to train another DL or ML model or network.

In one embodiment, the corresponding images of the one or more specimens are generated by a first mode of an imaging system, the one or more components include an additional GAN trained with an additional training set that includes the portions of the design data for the one or more specimens designated as additional training inputs and corresponding additional images of the one or more specimens designated as additional training outputs, the corresponding additional images are generated by a second mode of the imaging system different than the first mode, and the one or more computer subsystems are configured for generating an additional simulated image for the specimen by inputting the portion of the design data for the specimen into the additional GAN.

In such embodiments, therefore, different GANs may be trained to produce images or other output for different modes. In particular, in most cases, different modes of an inspection or other imaging tool will produce images and/or output that are different from each other in one of several possible ways, e.g., noise levels, contrast, resolution, image type (e.g., DF vs. BF, optical vs. electron beam, etc.), and the like. Therefore, if a GAN is trained to produce output or images for one mode of a tool, chances are it will be unsuitably trained to produce output or simulated images for another mode of the tool. As such, multiple GANs may be separately and independently trained, one for each mode of interest. The same pre-trained GAN network may however be used for each mode although that is not necessary. Each trained GAN may then be used to generate a mode specific data set. The input to each differently trained GAN, however, may be the same design clips or different portions of the same design since the design of the specimen will not change from mode to mode.

If the GANs are trained or used to generate simulated defect images, the simulated images generated by the trained GANs for different modes may then be used to train one or more DL or ML models or networks. For example, if the embodiments described herein generate or augment a training data set with the simulated image(s) generated by the GANs, that training data set can be used to train a neural network for single and multiple optical (or other) modes, which may be performed as described in U.S. Pat. No. 10,115,040 to Brauer issued Oct. 30, 2018 and U.S. Pat. No. 10,360,477 to Bhaskar et al. issued Jul. 23, 2019, which are incorporated by reference as if fully set forth herein. The embodiments described herein may be further configured as described in these patents. Whether one or more DL or ML models or networks are trained using the training set may depend on the intended use of the DL or ML model(s) or network(s) and what their inputs are. For example, one DL or ML model or network may be configured to perform nuisance filtering or defect classification using multiple mode images as inputs. Therefore, simulated images generated for the multiple modes may be used to train the model or network. In another example, one DL or ML model or network may be configured to perform nuisance filtering using images from a first mode as inputs, and a different DL or ML model or network may be configured to perform defect classification using images from a second mode as inputs. In this manner, simulated images generated for the first mode may be used to train one DL or ML model or network, and simulated images generated for the second mode may be used to train another DL or ML model or network.

If the GANs are trained or used to generate simulated reference images, different simulated reference images may be generated and stored as described further herein for different modes. For example, if defect detection is to be performed in a die-to-database manner, each mode may require its own reference image that is subtracted from test images generated in each mode. Therefore, when different GANs are trained as described herein for different modes, the different GANs may be used to generate different reference images, each of which may be used in the same inspection process but for different modes.

In some embodiments, the one or more computer subsystems are configured to train a ML model using the simulated image. In some such embodiments, the additional generated samples, e.g., simulated images, can be used for augmenting training data sets or by adding to other augmentation based defect examples produced by augmentation techniques such as those described in U.S. Pat. No. 10,402,688 to Brauer et al. issued Sep. 3, 2019, which is incorporated by reference as if fully set forth herein. The embodiments described herein may be further configured as described in this patent. The simulated images may be added to a training set and/or used to create a new training set in any suitable manner known in the art. The ML model that is trained using the simulated image(s) described herein may have any suitable configuration known in the art. Training the ML model using the simulated image(s) generated as described herein may otherwise be performed as described herein or in any other suitable manner known in the art.

In one such embodiment, the ML model is configured for nuisance filtering. One advantage of the embodiments described herein is that the approach described herein or a derivation of it allows reduction of nuisance which in turn allows semiconductor manufacturers to make more reliable process decisions and thus not waste money using the incorrect processing conditions. In another such embodiment, the ML model is configured for defect classification. In this manner, the ML model may identify different types of defects and assign them to different classes or groups. A ML model that is trained using the simulated images described herein may have any suitable configuration known in the art whether it is configured for nuisance filtering or defect classification.

In another embodiment, the simulated image is a reference image, and the system includes an inspection system configured for detecting defects on the specimen by subtracting the reference image from images of the specimen generated by the inspection system. For example, if the simulated image(s) are generated for use in die-to-database type inspections, the one or more computer subsystems may input every given design clip or full frame design or even a full die design into the trained GAN to thereby generate a reference image. This artificial image may then be used as a reference image for defect inspection. In this manner, the embodiments described herein can be used to generate an artificial optical (or other) reference image to perform die-to-database inspections. One novel feature of the embodiments described herein is therefore that they provide a method for improved optical defect inspection using a GAN or cGAN for the artificial creation of optical reference patch images which can be used for optical die-to-database inspections. Another novel feature of the embodiments described herein is that they provide a method for improved optical defect inspection using a GAN or cGAN for an unsupervised DL method for optical reference image generation.

The computer subsystem(s) may be configured for storing a variety of information, images, etc. generated by the embodiments described herein. For example, the computer subsystem(s) may be configured for storing the simulated augmented defect image(s) generated by the GAN for use in training of a ML or DL model or network such as those described herein. In one such example, the computer subsystem(s) may store the simulated defect image(s) in a data structure or file containing the training set that is being augmented by the simulated defect image(s). The simulated defect image(s) may be stored in any suitable manner and in any computer-readable storage medium described herein.

In another example, the computer subsystem(s) may be configured for storing the simulated reference image and/or a ML or DL model or network trained using a training set augmented with one or more simulated images generated by the embodiments described herein for use in inspection of the specimen or another specimen of the same type. The computer subsystem(s) may be configured to store such image(s) and/or model or network in a recipe or by generating a recipe for the inspection in which the reference image(s) and/or model or network will be used. A "recipe" as that term is used herein is defined as a set of instructions that can be used by a tool to perform a process on a specimen. In this manner, generating a recipe may include generating information for how a process is to be performed, which can then be used to generate the instructions for performing that process. The computer subsystem(s) may also store any information for the reference image(s) and/or model or network that can be used to identify, access, and/or use the image(s) and/or model or network (e.g., such as a file name and where it is stored). The information for the model or network that is stored may also include the code, instructions, algorithms, etc. for the model or network. The reference image(s), model or network, or information therefor may be stored in any suitable manner in any of the computer-readable storage media described herein.

The images, model or network, and information therefor may be stored with any of the other results described herein and may be stored in any manner known in the art. The storage medium may include any storage medium described herein or any other suitable storage medium known in the art. After the information has been stored, the information can be accessed in the storage medium and used by any of the method or system embodiments described herein, formatted for display to a user, used by another software module, method, or system, etc. For example, the embodiments described herein may generate an inspection recipe as described above. That inspection recipe may then be stored and used by the system or method (or another system or method) to inspect the specimen or other specimens to thereby generate information (e.g., defect information) for the specimen or other specimens.

Results and information generated by performing the inspection on the specimen or other specimens of the same type may be used in a variety of manners by the embodiments described herein and/or other systems and methods. Such functions include, but are not limited to, altering a process such as a fabrication process or step that was or will be performed on the inspected specimen or another specimen in a feedback or feedforward manner. For example, the computer subsystem(s) described herein may be configured to determine one or more changes to a process that was performed on a specimen inspected as described herein and/or a process that will be performed on the specimen based on the detected defect(s). The changes to the process may include any suitable changes to one or more parameters of the process. The computer subsystem(s) described herein preferably determine those changes such that the defects can be reduced or prevented on other specimens on which the revised process is performed, the defects can be corrected or eliminated on the specimen in another process performed on the specimen, the defects can be compensated for in another process performed on the specimen, etc. The computer subsystem(s) described herein may determine such changes in any suitable manner known in the art.

Those changes can then be sent to a semiconductor fabrication system (not shown) or a storage medium (not shown) accessible to the computer subsystem(s) and the semiconductor fabrication system. The semiconductor fabrication system may or may not be part of the system embodiments described herein. For example, the computer subsystem(s) and/or inspection system described herein may be coupled to the to semiconductor fabrication system, e.g., via one or more common elements such as a housing, a power supply, a specimen handling device or mechanism, etc. The semiconductor fabrication system may include any semiconductor fabrication system known in the art such as a lithography tool, an etch tool, a chemical-mechanical polishing (CMP) tool, a deposition tool, and the like.

As described herein, therefore, the embodiments can be used to setup a new inspection process or recipe. The embodiments may also be used to modify an existing inspection process or recipe, whether that is an inspection process or recipe that was used for the specimen or was created for one specimen and is being adapted for another specimen.

The embodiments described herein are not limited to inspection recipe or process creation or modification. For example, the embodiments described herein can also be used to setup or modify a recipe or process for metrology, defect review, etc. in a similar manner. In particular, the GANs described herein can be trained depending on the process that is being setup or revised (e.g., to generate simulated outputs that mimic the actual outputs that would be generated by the process). Then, depending on the process or recipe that is being setup or altered, the simulated outputs may be used to setup a recipe for that process, whether that is storing a simulated reference image that is used in the process or to train a DL or ML model or network for use in the process. Such output processing methods may include, for example, defect re-detection methods used for re-detecting defects in output generated by a defect review system.

In a similar manner, the embodiments described herein may be used to select not just output processing parameters and methods but also output acquisition parameters or modes, which with, for example, an inspection system, a metrology system, or a defect review system detects light, electrons, ions, etc. from a specimen. Such output acquisition parameter selection may include training and using different GANs to generate simulated images for different output acquisition parameters or modes, which may be performed as described further herein. The generated simulated images can then be compared and evaluated to select which modes or parameters are the best for any one process. The embodiments described herein can therefore be used not just for setting up or modifying an inspection process but also for setting up or modifying any quality control type process performed on the specimens described herein and any parameters of such a process.

Each of the embodiments of each of the systems described above may be combined together into one single embodiment.

Another embodiment relates to a computer-implemented method for generating a simulated image of a specimen. The method includes generating a simulated image for a specimen by inputting a portion of design data for the specimen into a GAN. The inputting is performed by one or more computer subsystems. One or more components are executed by the one or more computer subsystems. The one or more components include the GAN. The GAN is trained with a training set that includes portions of design data for one or more specimens designated as training inputs and corresponding images of the one or more specimens designated as training outputs.

Each of the steps of the method may be performed as described further herein. The method may also include any other step(s) that can be performed by the system, computer subsystem(s), component(s), and/or GANs described herein. The computer subsystem(s) may be configured according to any of the embodiments described herein, e.g., computer subsystem(s) 102. The one or more components and the GAN may also be configured according to any of the embodiments described herein. The method may be performed by any of the system embodiments described herein.

Figure 7:
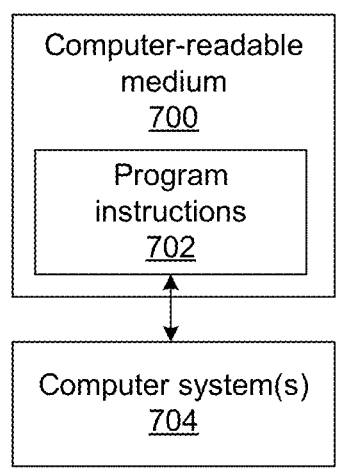
FIG. 7 is a block diagram illustrating one embodiment of a non-transitory computer-readable medium storing program instructions for causing computer system(s) to perform a computer-implemented method described herein.

An additional embodiment relates to a non-transitory computer-readable medium storing program instructions executable on one or more computer systems for performing a computer-implemented method for generating a simulated image of a specimen. One such embodiment is shown in FIG. 7. In particular, as shown in FIG. 7, non-transitory computer-readable medium 700 includes program instructions 702 executable on computer system(s) 704. The computer-implemented method may include any step(s) of any method(s) described herein.

Program instructions 702 implementing methods such as those described herein may be stored on computer-readable medium 700. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), SSE (Streaming SIMD Extension) or other technologies or methodologies, as desired.

Computer system(s) 704 may be configured according to any of the embodiments described herein.

Further modifications and alternative embodiments of various aspects of the invention will be apparent to those skilled in the art in view of this description. For example, methods and systems for generating a simulated image for a specimen are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A system configured to generate a simulated image of a specimen, comprising:
   one or more computer subsystems; and
   one or more components executed by the one or more computer subsystems, wherein the one or more components comprise a generative adversarial network trained with a training set comprising portions of design data for one or more specimens designated as training inputs and corresponding images of the one or more specimens designated as training outputs; and
   wherein the one or more computer subsystems are configured for:
      generating a portion of design data for a specimen input to the generative adversarial network by modifying original design data for the specimen with a synthetic defect; and
      generating a simulated image for the specimen by inputting the portion of the design data for the specimen into the generative adversarial network, wherein the simulated image comprises an augmented defect image of the synthetic defect.

2. The system of claim 1, wherein the generative adversarial network is configured as a conditional generative adversarial network.

3. The system of claim 1, wherein a number of actual defects detectable on the one or more specimens and the specimen by an inspection system is insufficient for training a machine learning model.

4. The system of claim 1, wherein the one or more computer subsystems are further configured for determining one or more characteristics of the synthetic defect based on one or more defects detected on the one or more specimens.

5. The system of claim 1, wherein the one or more computer subsystems are further configured for determining one or more characteristics of the synthetic defect without information for one or more actual defects detected on the one or more specimens or the specimen.

6. The system of claim 1, wherein the synthetic defect is a first type of defect of interest, wherein the one or more computer subsystems are further configured for generating an additional portion of the design data for the specimen by modifying the original design data for the specimen with an additional synthetic defect, wherein the additional synthetic defect is a second type of defect of interest different than the first type, and wherein the one or more computer subsystems are further configured for generating an additional simulated image for the specimen by inputting the additional portion of the design data into the generative adversarial network.

7. The system of claim 1, wherein the one or more computer subsystems are further configured for determining one or more characteristics of the synthetic defect based on one or more defects detected on one or more additional specimens, wherein the one or more additional specimens are formed in one or more process steps, wherein a change in the one or more process steps occurs prior to the one or more process steps being used to form the specimen, wherein a machine learning model was trained to perform one or more functions for the one or more additional specimens, and wherein the one or more computer subsystems are further configured to re-train the machine learning model using the simulated image.

8. The system of claim 1, wherein the corresponding images of the one or more specimens are generated by a first mode of an imaging system, wherein the one or more components further comprise an additional generative adversarial network trained with an additional training set comprising the portions of the design data for the one or more specimens designated as additional training inputs and corresponding additional images of the one or more specimens designated as additional training outputs, wherein the corresponding additional images are generated by a second mode of the imaging system different than the first mode, and wherein the one or more computer subsystems are further configured for generating an additional simulated image for the specimen by inputting the portion of the design data for the specimen into the additional generative adversarial network.

9. The system of claim 1, wherein the one or more specimens used to generate the training set are different from the specimen for which the generative adversarial network generates the simulated image.

10. The system of claim 1, wherein the one or more specimens used to generate the training set are different from the specimen for which the generative adversarial network generates the simulated image, and wherein a design for the specimen for which the simulated image is generated is different than one or more designs for the one or more specimens.

11. The system of claim 1, wherein the one or more computer subsystems are further configured to train a machine learning model using the simulated image.

12. The system of claim 11, wherein the machine learning model is configured for nuisance filtering.

13. The system of claim 11, wherein the machine learning model is configured for defect classification.

14. The system of claim 1, wherein the one or more computer subsystems are further configured for generating an additional simulated image for the specimen by inputting a portion of the original design data for the specimen into the generative adversarial network, wherein the additional simulated image is a reference image, and wherein the system further comprises an inspection system configured for detecting defects on the specimen by subtracting the reference image from images of the specimen generated by the inspection system.

15. The system of claim 1, wherein the simulated image is a simulated optical image.

16. The system of claim 1, wherein the specimen is a wafer.

17. A non-transitory computer-readable medium, storing program instructions executable on one or more computer systems for performing a computer-implemented method for generating a simulated image of a specimen, wherein the computer-implemented method comprises:
   generating a portion of design data for a specimen input to a generative adversarial network by modifying original design data for the specimen with a synthetic defect;
   generating a simulated image for the specimen by inputting the portion of the design data for the specimen into the generative adversarial network, wherein the simulated image comprises an augmented defect image of the synthetic defect, and wherein said inputting is performed by the one or more computer systems;
   wherein one or more components are executed by the one or more computer systems, wherein the one or more components comprise the generative adversarial network; and
   wherein the generative adversarial network is trained with a training set comprising portions of design data for one or more specimens designated as training inputs and corresponding images of the one or more specimens designated as training outputs.

18. A computer-implemented method for generating a simulated image of a specimen, comprising:

generating a portion of design data for a specimen input to a generative adversarial network by modifying original design data for the specimen with a synthetic defect;

generating a simulated image for the specimen by inputting the portion of the design data for the specimen into the generative adversarial network, wherein the simulated image comprises an augmented defect image of the synthetic defect, and wherein said inputting is performed by one or more computer subsystems;

wherein one or more components are executed by the one or more computer subsystems, wherein the one or more components comprise the generative adversarial network; and wherein the generative adversarial network is trained with a training set comprising portions of design data for one or more specimens designated as training inputs and corresponding images of the one or more specimens designated as training outputs.

\* \* \* \* \*